UNITED STATES PATENT OFFICE.

JAMES W. H. RANDALL, OF WESTERN PORT, MARYLAND, ASSIGNOR TO INDUSTRIAL CHEMICAL COMPANY, OF NEW YORK, N. Y., A CORPORATION OF NEW YORK.

PRODUCTION OF ACETATES, &c.

1,338,040.   Specification of Letters Patent.   Patented Apr. 27, 1920.

No Drawing.   Application filed June 27, 1917.   Serial No. 177,414.

*To all whom it may concern:*

Be it known that I, JAMES W. H. RANDALL, a subject of the King of Great Britain, and resident of Western Port, Allegany county, Maryland, have made a certain new and useful Invention Relating to the Production of Acetates, &c, of which the following is a specification.

This invention relates especially to the production of acetates and related material from carbohydrate material including sugars, starches, glucose, cellulose, gum and the like, by conversion thereof by the action of caustic alkali material under proper conditions of heat and moisture so as to produce acetates which can be converted into related bodies, such as acetic acid, acetone, etc. The carbo-hydrate material dissolved or combined with water is combined with suitable caustic materials, such as caustic soda or potash so as to form a concentrated causticized solution, or quasi solution of the organic material which when properly concentrated to a specific gravity of 1.4 to 1.5 more or less is then combined with sufficient caustic lime or equivalent material to have a converting action on the organic compounds present and more or less convert them into acetate material, the treated mixture being usually in the form of rather dry porous material from which most of the free moisture has been driven off by the reaction with lime. This conversion action is promoted by heating the dry causticized material in the absence of air for a number of hours to temperatures of 250 to 300 degrees centigrade, more or less, which seems to convert further quantities of the organic material into acetate form.

As an illustrative example of the manner of carrying out this process a suitable quantity of ordinary commercial cane sugar may be dissolved in a sodium hydrate solution of about 1.4 specific gravity so that the causticized solution contains about 80 per cent. as much caustic soda by weight as the weight of the cane sugar used. This solution which is usually sufficiently concentrated may then be combined with powdered quicklime to the extent of 40 or 50 per cent. by weight of the weight of the hot causticized solution and this quicklime may be rapidly and thoroughly stirred into the causticized solution so that slacking occurs with the consequent evolution of heat which drives off considerable quantities of water from the solution to produce damp porous lumps from which the sensible moisture is largely driven off. This dry causticized material may with advantage be further converted by heating and simultaneously agitating the same in the absence of air for four or five hours more or less at temperatures of 250 to 300 degrees centigrade or so, which seems to convert still further amounts of the organic material into acetate form. The converted causticized material may be cooled in the absence of air or other undesirable oxidizing material and the acetates extracted by water leaching or other suitable process, or if desired the converted causticized material may be dry distilled at proper temperature preferably by the use of steam to produce acetone, etc.

Another illustrative example of this process using as the carbo-hydrate material a sample of commercial corn glucose sold under the name of corn molasses or corn syrup may comprise the evaporation of this material to a density of about 1.50 and combining therewith sufficient caustic soda solution of a specific gravity of 1.4 so that the caustic soda used amounted to about 40% by weight of the weight of the original molasses which contained some 50 per cent. or so of sugar and glucose. The causticized solution may then be poured while hot over a suitable quantity of powdered quicklime which was thoroughly incorporated therewith by agitation, the lime being used to the extent of between 40 to 50 per cent. by weight of the causticized mixture. This mixture boils or froths up considerably and after the reaction has subsided is in a substantially dry porous condition. This dry causticized material may then be heated for five or six hours under pressure in a sealed container out of contact with air at a temperature between 250 and 270 degrees centigrade, after which it may be allowed to cool in the sealed container, for instance. This converted causticized material produced in this way may contain large proportions of acetates which have been found therein to the extent of some 15 per cent. or so of its weight together with some oxalates. In this way considerably higher yields of acetone can be secured from molasses than can be produced by the much more expensive and complicated fermentation and oxidation process commercially employed.

This invention has been described in connection with a number of illustrative embodiments, materials and conditions, to the details of which disclosure the invention is not of course to be limited, since what is claimed as new and what is desired to be secured by Letters Patent is set forth in the appended claims:

1. The process of making acetates from water soluble carbo-hydrate material, which comprises forming a water solution of such carbo-hydrate material and combining therewith caustic soda and evaporating the causticized carbo-hydrate solution to a density of about 1.4, combining and agitating therewith powdered quicklime to the extent of about fifty per cent. by weight of the solution to form a substantially dry causticized material, heating such dry causticized material under pressure and in the absence of undesirable oxidizing material for several hours at temperatures of about 250 to 300 degrees centigrade and cooling the same in the absence of air to convert further material into acetate without substantial destructive distillation and extracting the formed acetates by leaching with water.

2. The process of making acetates from water soluble carbo-hydrate material, which comprises forming a water solution of such carbo-hydrate material and combining therewith caustic alkali and producing causticized carbo-hydrate solution having a density of about 1.4, combining and agitating therewith powdered quicklime to the extent of about fifty per cent. by weight of the solution to form a substantially dry causticized material and heating such dry causticized material under pressure and in the absence of undesirable oxidizing materal for several hours at temperatures of about 250 to 300 degrees centigrade and cooling the same in the absence of air to convert further material into acetate form.

3. The process of making acetates from water soluble carbo-hydrate material, which comprises forming a water solution of such carbo-hydrate material and combining therewith caustic alkali and producing causticized carbo-hydrate solution, combining and agitating therewith powdered quicklime to form a substantially dry causticized material and heating such dry causticized material in the absence of undesirable oxidizing material for several hours at temperatures to convert further material into acetate form.

4. The process of making acetates from carbo-hydrate material, which comprises forming a causticized water solution of such carbo-hydrate material and caustic soda having a density of over 1.3, combining therewith stronger earthy alkali material to the extent of about fifty per cent. by weight of the solution to form a substantially dry causticized material, and heating such dry causticized material under pressure and in the absence of undesirable oxidizing material for several hours at temperatures of about 250 to 300 degrees centigrade to convert further material into acetate form.

5. The process of making acetates from carbo-hydrate materials, which comprises forming a causticized water solution of such carbo-hydrate material and caustic soda, combining therewith a strong earthy alkali material to form a substantially dry causticized material, and heating such dry causticized material in the absence of undesirable oxidizing material to convert further material into acetate form.

6. The process of making acetates from water soluble carbo-hydrate material, which comprises combining with such carbo-hydrate material caustic soda and quicklime to form a substantially dry causticized material and heating such dry causticized material under pressure and in the absence of air for several hours at temperatures of about 250 to 300 degrees centigrade to convert further material into acetate form.

7. The process of making acetates from sugary and similar organic material, which comprises forming a causticized water solution of such material combined with caustic soda, combining and agitating therewith powdered quicklime to the extent of about fifty per cent. by weight of the solution to convert portions of the material into acetates and form substantially dry causticized material, and heating such dry causticized material under pressure and in the absence of air for several hours at temperatures of about 250 to 300 degrees centigrade and cooling the same in the absence of air to convert further material into acetate form.

8. The process of making acetates from sugary material and the like, which comprises forming a causticized water solution of such material combined with caustic alkali, combining therewith quicklime to convert portions of the material into acetates and form substantially dry causticized material, and heating such dry causticized material and in the absence of air to convert further material into acetate form.

9. The process of making acetates from water soluble sugars and similar carbo-hydrate material, which comprises forming a water solution of such carbo-hydrate material combined with caustic soda, combining and agitating therewith powdered quicklime to form a substantially dry causticized material, heating such dry causticized material under pressure and in the absence of undesirable oxidizing gases to convert further material into acetate form without substantial destructive distillation and extracting the formed acetates by leaching with water.

10. The process of making acetates from water soluble sugars and similar carbo-hydrate material, which comprises forming a water solution of such carbo-hydrate material combined with caustic soda, combining therewith powdered quicklime to form a substantially dry causticized material, heating such dry causticized material in the absence of undesirable oxidizing gases to convert further material into acetate form.

11. The process of making acetates from sugar which comprises forming a causticized water solution of such material combined with caustic soda, combining therewith quicklime to form acetates and produce substantially dry causticized material and heating such dry causticized material in the absence of undesirable oxidizing gases to convert additional material into acetate form.

12. The process of making acetates from water soluble sugary material which comprises forming a causticized water solution of such material combined with caustic alkali and combining therewith quicklime to form acetates and produce substantially dry causticized material.

JAMES W. H. RANDALL.

Witnesses:
HARRY L. DUNCAN,
JESSIE B. KAY.